United States Patent
Croughan-Peeren

[11] Patent Number: 5,627,888
[45] Date of Patent: May 6, 1997

[54] TELECOMMUNICATION SYSTEM FOR HANDLING BASIC AND SUPPLEMENTARY FUNCTIONS

[75] Inventor: René J. Croughan-Peeren, Oosterhout, Netherlands

[73] Assignee: Telefonaktiebolaget LM Ericsson, Stockholm, Sweden

[21] Appl. No.: 388,449

[22] Filed: Feb. 14, 1995

[30] Foreign Application Priority Data

Feb. 15, 1994 [SE] Sweden ............................. 9400505

[51] Int. Cl.⁶ .................................................. H04M 3/42
[52] U.S. Cl. ........................... 379/201; 379/211; 379/215; 379/266
[58] Field of Search .................................. 379/201, 207, 379/94, 67, 200, 202, 203, 204, 157, 265, 266, 209, 211, 215

[56] References Cited

U.S. PATENT DOCUMENTS

| | | | |
|---|---|---|---|
| 4,928,304 | 5/1990 | Sakai | 379/94 |
| 5,115,432 | 5/1992 | Haas | 370/94.1 |
| 5,323,452 | 6/1994 | Dickman et al. | 379/201 |
| 5,337,351 | 8/1994 | Manabe et al. | 379/201 |
| 5,343,517 | 8/1994 | Bogart et al. | 379/207 |
| 5,345,380 | 9/1994 | Babson, III et al. | 379/207 |
| 5,404,396 | 4/1995 | Brennan | 379/201 |

FOREIGN PATENT DOCUMENTS 0228053  7/1987  European Pat. Off. ............ G06F 9/44

OTHER PUBLICATIONS

"Service Script Interpreter, an Advanced Intelligent Network Platform", Paul van Hal et al., *Ericsson Review* No. 67 (1990), pp. 12–22.

"European digital cellular telecommunication system (phase 1); General on Supplementary Services", GSM Recommendation No. 02.04, 1992.

*Primary Examiner*—Thomas W. Brown
*Assistant Examiner*—Scott Wolinsky
*Attorney, Agent, or Firm*—Burns, Doane, Swecker & Mathis, L.L.P.

[57] ABSTRACT

A system handling basic functions and supplementary functions in a telecommunication network serving a plurality of users, who can communicate with each other by the telecommunication network. The users are allowed to subscribe to basic services and supplementary services, enabling the users to make use of the basic functions and supplementary functions, respectively. The system includes a platform containing the basic functions and implementing the supplementary function interfaces which each link one or more of the supplementary functions to the platform. Each supplementary function consists of one or more supplementary function link modules, one for each of the interfaces that the supplementary function may need to use. The supplementary function link modules are located in a supplementary function plane. Interaction logic used for detecting and solving conflicts between supplementary functions consists of interaction logic link modules located in an interaction logic plane. The supplementary functions and supplementary function interfaces are transparent for the interaction logic. The interaction logic link modules are linkable to the supplementary functions.

38 Claims, 4 Drawing Sheets

Fig. 5 so important that many supplementary functions can be added without disturbing the basic functions.

TELECOMMUNICATION SYSTEM FOR HANDLING BASIC AND SUPPLEMENTARY FUNCTIONS

BACKGROUND

Generally and according to a first aspect the present invention relates to a system for handling the use of basic functions and supplementary functions in a telecommunication network including a plurality of users which can call each other and subscribe to basic services and supplementary functions relating to the basic and supplementary functions, respectively. A platform contains the basic functions and implements interfaces which each link one or more of the supplementary functions to the platform. Each supplementary function consists of one or more link modules, one per interface, that the supplementary function desires to use. Interaction logic is used for detecting and solving conflicts between supplementary functions.

More particularly, and according to a second aspect, the invention relates to a telecommunication system structured for including a set of basic functions and a set of supplementary functions. Each of said supplementary functions is connectable to a certain basic function for forming an addition to and modifying this basic function. The basic functions implement one or more open interfaces the functionality of which is not specific for any supplementary function, and which admit interaction between said basic functions and said supplementary functions in a way to allow new supplementary functions to be added to the system without affecting the basic functions. Interaction logic is used for solving problems arising from the respective behaviors of two supplementary functions, which are simultaneously connected to a specific basic function, coming into conflict with each other.

Commercial products in a telecommunication network usually have a set of basic functions which may be regarded as essential for that type of product. Basic functions may be said to distinguish different types of products from each other. A telephone must e.g. allow the user to establish calls in the network. A fax machine must be able to receive calls and write a message from the user from which the call originates. Besides these basic functions commercial Products usually offer some supplementary functions, which distinguish different products of the same type. Certain telephones may e.g. have a re-dial call button allowing the user to easily dial the number dialed last. Certain fax machines have the possibility to listen to recorded messages from anywhere in the network.

In the above defined connection there are certain concepts which may need clarification here and of which some are mentioned above and further below. These concepts are:

Network operator; this is an organization running a physical communication network. In Sweden Telia is an example.

System manufacturer; this is an organization that has created and provides a communication network for the network operator. In Sweden this is Ericsson for Telia. In the Netherlands it is Ericsson and AT&T for Dutch PTT.

User; this is a person or organization which can use a service in a communication network. The concept user is therefore not used without being related to a service or a group of services. Often a user is the same as a subscriber.

Service provider; this is a person or organization providing a service for one or several users. Today's service provider normally is the same as the network operator, a condition that is expected to remain within a foreseable future. Service providers may also be users of services which are provided by another provider.

Each user in a telecommunication network uses it mainly for communicating with other users. In order for the user to be able to use the functions in the network e.g. establish a call, the user must subscribe, i.e. become a subscriber to applicable services. If a user desires to use basic functions of the system, the user must thus subscribe to the right basic services and if a user desires to use supplementary functions of the system the user has to subscribe to the right supplementary services.

By a subscription a specific service is thus provided for a user. The user, or the provider of the service on behalf of the user, may then activate a corresponding function. The function will then perform specific measures for the user. A call request is e.g. activated by lifting the telephone receiver. 'Call Forwarding' is a feature which when activated will forward calls destined to the user for which the service is provided, to an alternative destination.

Since services are provided on a per user basis, the activated function should not have a greater influence on the system than what is determined by an agreement between the user and the provider of services as Dart of a service agreement. 'Call Waiting' admits e.g. queuing of a call to a busy access. When the service is provided the accesses for which 'Call Waiting' may queue calls is limited to the access that the user hires from the provider. This function is therefore said to be "activated for the access", by a user owning the access. If the access is owned by several users which is e.g. possible in ISDN, only such calls will be queued which are destined for the user having activated 'Call Waiting'.

The concepts of basic functions and supplementary functions, in the meaning here used, as well as the interactions discussed more closely below, are well known in the art. Shortly, each basic function and supplementary function is a code executed by computers in the telecommunication system. Activation of a desired supplementary service is performed by a jump instruction in the code of the executed basic function.

Recommendations relating to and describing basic functions and supplementary functions occur e.g. within the GSM system. Reference may e.g. be made to recommendation 02.04 regarding the above used denominations such as 'Call Waiting' etc. for some different supplementary functions.

In connection with the description of supplementary functions which may be exposed to the interaction problem there is also a description of the interaction in question and its consequence.

There may also be supplementary functions which are applicable only for the service provider, i.e. no user has access to such supplementary functions. The service provider need not subscribe to a service until these supplementary functions are activated. Many supplementary functions for network maintenance are e.g. activated for a transmission route: supplementary functions introducing priority lines within the transmission route, or supplementary functions automatically blocking the route under certain conditions. Also users may lease transmission routes, or rather a user representing a group of users, e.g. a business group. In this case the user must subscribe to a service before any supplementary functions may be activated by the user relating to this transmission route.

The more services that are available the more attractive is a provider of these services for "potential" users. It is therefore essential for the provider to be able to offer a competitive set of services, basic services as well as supplementary services. Offering new supplementary services is regarded to be the fastest way of attaining this due to the fact that implementation of the included supplementary service only requires small modifications of the basic function. A large widening of the number of supplementary services may therefore be expected. This requires a short cycle of introduction, i.e. from the rise of the need until the installation, of new supplementary services. Since the providing and activating principles are very straight forward it will be the supplementary service part that may form an obstacle to attain short introduction cycles. These supplementary services are therefore mostly implemented as software.

To change a complete telecommunication system each time a new supplementary service is introduced is too expensive. A mimimum requirement on a system is therefore that it must be modular. A modular system admits introduction of new and removal of old supplementary functions without affecting other installed supplementary functions. Each supplementary function is installed as a separate loading module.

This modularity may be attained by means of a platform. The platform contains the basic functions. It also implements one or more interfaces. Each interface links one or more supplementary functions to the basic functions which admits interaction between the supplementary and basic functions.

A supplementary function can consist of one or more link modules, one for each interface, that the supplementary function desires to use. A link module is a module that can be linked to an interface without affecting, in connection with the linking, other modules which are linked to the same interface.

Each interface consists of operations and triggers. Triggers are calls to operations which when executed perform specific changes in the behavior of the basic function. When these changes appear the corresponding trigger is sent to the supplementary services linked to the interface. Each supplementary service can then react on the trigger by ordering the platform to execute one or more operations. The platform will schedule the execution of the supplementary services, i.e. decide in what order supplementary services shall receive the trigger.

This results in a two way interaction between platform and supplementary services.

The interface is open, by which it is meant in the present connection that it shall be generic for all services, as well as be able to be used by more than one service in the same system. In other words, there are no operations or triggers which are specific for any supplementary service. The platform itself must not contain any code specific for any supplementary service. Future upgradings of the platform must implement interfaces which are compatible with previous versions. These properties secure modularity between the platform and the supplementary functions. The supplementary functions can be installed, designed and upgraded without affecting the platform, and the platform can be upgraded without affecting the supplementary functions.

Most users will only have activated a few supplementary functions. It is therefore important that the handling of triggers is optimized for avoiding a lot of overhead in the processor capacity. For each activation of a basic function, e.g. at a call or an operator procedure, a trigger should thus only be received by those supplementary functions which are applicable for this specific activation. This can be attained by building the link picture, stating the supplementary functions which are linked to an interface, during the execution of the basic function itself. Only supplementary functions which are activated will then be linked and triggers will only be sent to them. If a certain call e.g. includes a transmission route, for which a supplementary function is activated, then the appropriate link module in this supplementary function will be linked to the call. The supplementary function can now receive triggers from the call. This procedure is often referred to as "dynamic linking". For further optimization triggers may be sent only to a subset of the linked supplementary functions, viz. those that have indicated interest for this trigger. Such a mechanism is called "monitoring".

Dynamic linking is not unusual. In C++ the principle for "dynamic binding" can be used for implementing dynamic linking. In PLEX signals carry their destination as dynamic data (the mechanism used for communicating between modules). In AXE-10 this function included in PLEX is used for implementing a "traffic link" (=an active call), where the modules can be "in-linked" or "side-linked" (=dynamic linking).

The conventional technique within the art suffers from some problems.

Once a platform has been implemented as described above, modularity is attained between supplementary function and platform. By using the same platform, unfortunately supplementary functions may end in a conflict with respect to their mutual behaviors. As a possible solution to the conflict between two or more supplementary functions it is known to design the supplementary functions affected by the conflict so that they interact with each other in order to solve the conflict. Between supplementary functions in this structure there are thus no natural modularity preventing conflicts to appear. Compare e.g. 'Call Forwarding on Busy' and 'Call Waiting'. 'Call Forwarding on Busy' forwards a call if the user is busy. 'Call Waiting' will instead queue a call for the busy user. The two supplementary functions must interact to come to an agreement. Both can e.g. be activated, but if the original destination answers first, ringing to the alternative destination is stopped, and if the alternative destination answers first, the call will be removed from the 'Call Waiting' queue.

As long as there are not so many supplementary functions in the system, interactions may be quite simply implemented in the supplementary functions themselves. With a growing number of supplementary functions the total introduction cycle for each new supplementary function becomes longer because more and more already installed supplementary functions have to be upgraded. This can result in an introduction disturbance in the system. This problem is often referred to as "interaction problem". Each solution must guarantee modularity between all supplementary functions. The invention starts from the realization that interactions should not be implemented in the supplementary functions proper. Of course the way this is performed must not create more problems than it solves.

In a traditional architecture the coordination mechanism, in the form of software solving conflicts between supplementary functions, is logically a part of the platform, but is implemented as a separate module, i.e. it can be upgraded separately. From the point of view of a supplementary function the coordination module belongs to the platform. As long as no coordination is required the coordination module will only forward ordered operations from supplementary functions to the platform and forward triggers from the platform to one or more supplementary functions. The coordination module will also perform the dynamic linking required.

The coordination module will detect a conflict either when a supplementary function provides an operation or when the platform sends a trigger. The logic detecting a conflict is referred to as "detection logic" and has access to the following information:

Supplementary functions linked to the specific activation.

Earlier operations of linked supplementary functions.

Triggers which have been sent earlier to linked supplementary functions.

The present operation/trigger.

Information which may be stored in the platform and accessed by the coordination module. E.g. 'call-state'. The coordination module can then perform coordinative actions for avoiding a conflict. This is called "solution logic". They include:

Rescheduling execution of supplementary functions on a trigger.

Ignoring, replacing or extending specific operations from certain supplementary functions, or certain triggers to certain supplementary functions.

This traditional approach leads to a loose relationship between the supplementary function logic and interaction logic, i.e. detecting logic plus solution logic, of this supplementary function. As a result, no supplementary function related data or code is directly accessible by the coordination module, except for data stored in the platform, e.g. a data base. Not even data in the data base can be secure. Supplementary functions often copy this data during execution and then uses this copy for further processing. Another consequence of this structure is that there does not exist any feed back to the supplementary function. The supplementary function does therefore not know whether the operations ordered thereby are executed unmodified, or if it did not receive a monitored trigger. As a consequence of this supplementary functions are as simple as possible, but the interaction logic will consequently be more complicated. The involved complications are:

A great part of the execution of supplementary functions consists of operations towards the platform. A very detailed knowledge of the supplementary function is therefore required, probably more detailed than what is really needed for solving all possible conflicts of the supplementary functionality (no abstraction possible).

If a certain data is required for a correct decision, this data has to be extracted from the operations ordered by the supplementary function. The data must be stored until requested by the interaction logic. Changes in the data must be monitored as well by extracting these changes from the subsequent operations. Beside the complexity with respect to supervision of the data and its changes, it once again requires a detailed knowledge about the internal way of operation of the supplementary function.

All changes in the execution flow of a supplementary function must be carefully supervised by the detecting logic, if different branches in the execution flow may lead to different types of conflicts. A running state of the supplementary function must be maintained in the coordination module. Since decision logic and iteration logic cannot be monitored directly, operations and their data have to be interpreted for obtaining the necessary information. Once again this requires a detailed knowledge about the internal operation of the supplementary function.

The execution flow in the supplementary function cannot be affected by other means than by returning a specific result for an operation, or sending triggers to the supplementary function. These results and triggers are not specific for the supplementary service. As a result of this the possibilities of affecting the behavior of the supplementary function are minimal. After a conflict has been solved it may be required that the supplementary function continues in another way than earlier. This is maybe not possible. The solution logic must then also take over all normal, not conflicting functions of the supplementary function, until the supplementary function can be trigged in another way so that it may be able to continue. In the meantime the supplementary function has to be blocked.

Some of the described negative effects may be partly compensated for. A supplementary function may e.g. send certain information to the coordination module, such as a permission to state decision flow in the supplementary function. Since the supplementary function is not conscious of when this information should need to be applied, it must always be sent. This leads to an ineffective use of memory and processor capacity. Another possibility is to avoid the negative effects by only stating simple interactions. Such interactions are often controlled by priorities which are assigned to the supplementary functions. These priorities decide scheduling of the supplementary functions (higher priority before a lower priority) or may lead to blocking of low priority supplementary functions. Systems using this architecture have in practice turned out to be rather successful in handling these simple interactions, since the interaction logic quite easily may be controlled by tables. One example is the desired interaction between 'Call Forwarding on Busy' and 'Call Waiting'. Both act on a trigger 'Busy Access'. 'Call Forwarding' would then transfer the call to an alternative destination, whereas 'Call Waiting' would queue the call for the access until it becomes available. The interaction could consist in blocking 'Call Forwarding' so that the call instead is queued.

"More intelligent" solutions are however often preferred. In the case of 'Call Forwarding' and 'Call Waiting' one could e.g. decide to do both and let the interaction decide based upon the part answering the call first. This could e.g. require the possibility of eliminating 'Call Waiting' if the alternative destination answers. Another possibility is to transfer the call if 'Call Waiting' for some reason is not successful, e.g. because no resources are available for sending a tone to the user, or due to time out from the user. This could require sending the 'Busy' trigger again, but only to 'Call Forwarding', and only if the present state of the call would be compatible with 'Call Forwarding'.

The design of the supplementary function thus becomes simpler but the design of the interaction logic becomes more complicated as a result. This was acceptable when there were not so many supplementary functions installed. Providers of services usually have no strict demands for interactions, and therefore most interactions are kept as simple as possible. As users become more conscious of available and potential supplementary functions they require more supplementary functions faster, and more complicated interactions.

U.S. Pat. No. 5,115,432 describes an architecture for data communication adapted for communication over (high speed) networks. By data communication is here intended e.g. file, voice or video data. The architecture consists of two levels. The higher level consists of a number of independent "horizontal functions" which are performed in parallel. The lower level consists of basic functions towards the network. All low level functions and correpsonding processes are performed in a function for controlling access to the network. Dependencies, if any, between the horizontal functions are solved by means of a function intended therefore. The architecture thus offers these "horizontal functions" to interact on a level different from this low level.

EP 228,053 relates to a method for controlling a telecommunication system in real time. A structure is described which admits that supplementary functions may be easily modified/programmed and that interactions between different supplementary functions may be solved in a simple way. The solution according to the document is that the programs are written by means of "scripts" in a "non procedural language" and consist of a number of triplets. The interaction between these "scripts" admits that "scripts" with a higher level may allow "scripts" on a lower level to be implemented if its triplets indicate this.

U.S. Pat. No. 4,928,304 describes an electronic exchange system for a telecommunication network in the form of a telephone switch and an external computer connected thereto. Program sequences necessary for standard functions are stored in memory units in the telephone switch. Programs for performing services which are only available for part of the subscribers, are stored in the external computer. Via the external computer it is possible, by means of a computer interface, to control specific functions of the telephone switch. This architecture implies that changes of the different supplementary functions may be easily done by making changes in the programs of the external computer.

SUMMARY

The object of the present invention is to provide a new basic architecture admitting supplementary function transparency in the platform and interaction transparency in the supplementary functions. By basic architecture is here meant the architecture on an interface level, i.e. where the different types of interfaces are identified, possible principles for forming the interfaces, and how and by which type of software they may be used.

According to the first aspect the invention comprises a system for handling the use of basic functions and supplementary functions in a telecommunication network including a plurality of users, which can communicate with each other in the telecommunication network, and are allowed to subscribe to basic services and supplementary services, enabling them to make use of the basic functions and supplementary functions, respectively. The system includes a platform containing the basic functions and implementing supplementary function interfaces which each link one or more of the supplementary functions to the platform. Each supplementary function consists of one or more supplementary function link modules, one for each of the interfaces that the supplementary function may need to use. The supplementary function link modules are located in a supplementary function plane. Interaction logic used for detecting and solving conflicts between supplementary functions consists of interaction logic link modules located in an interaction logic plane. The supplementary functions and supplementary function interfaces are transparent for the interaction logic and the interaction logic link modules are linkable to the supplementary functions.

A telecommunication system of the kind defined by way of introduction according to the second aspect of the invention, is characterized by the improvement that the interaction logic includes interaction modules, that each supplementary function implements at least one open interface admitting interaction between the interaction modules in a way to allow new interaction modules, intended to interact with the supplementary function by use of this interface, to be added to the system without affecting the supplementary function, and that the open interface is for use by the interaction modules for interacting with supplementary functions in a way to avoid conflicts between the supplementary functions.

The interaction logic plane may include a number of interaction handler functions of which each is able to solve a specific conflict. Each interaction handler function consists of at least one link module for each supplementary function, the supplementary function interface of which is used by the interaction handler function. A new supplementary function is introduced into the system together with all necessary link modules in the different interaction handler functions required for handling interactions with other supplementary functions. Link modules in the same interaction handler function which are dependent on each other may form a loading module. In case a link module is no longer used, the loading module is removed, in which the link module is included.

The system may furthermore include an interface implemented by a supplementary function and containing several generic parts in the form of operations and triggers which are identical in different supplementary functions.

The interaction logic plane may also use interfaces between a supplementary function and the platform, and may be divided into a detection plane and a solution plane with appurtenant link modules. The solution plane may be structured so as to allow several solution modules to use the same detection module. The detection plane may be able to implement interfaces consisting only of triggers. The solution plane may include operations ignoring the detection plane for directly using the interface implemented by a supplementary function.

The system may furthermore comprise a module for generic functions which are very similar in the different planes and which are used by these and for handling interfaces. Functions for handling dynamic linking may be included in the module for generic functions. A function for scheduling execution of supplementary functions may be included in the module for generic functions, and is activated by a function of the platform or a supplementary function. The module for generic functions is adapted to receive operations changing a certain scheduling of execution of supplementary functions, and includes functions handling communication in planes between different link modules in one and the same supplementary function, and functions handling communication in the platform.

By the concept implementation used above and furtheron is meant, in a software connection, the design of programs which are necessary for fulfilling a certain specification. The specification defines what it is desired that the software shall do and could be a document in clear language. The implementation of an interface in software context implies implementation of all software required for being able to ink other modules to the interface supposing that the software that implements the interface is installed. Interfaces are usually separately specified due to the fact that modules linked together by an interface usually are designed by different designers, or even different enterprises. Linking implies that a module inked to an interface can perform operations defined in the interface and receives triggers which are defined in the interface when they are applicable. In the later case the software that implements the interface must secure that the trigger is sent to the linked modules.

An interface cannot be implemented without the language in some way supporting modular design, i.e. each module can be separately designed, but the modules will interact after the design (and this may happen during compilation, during installation or during execution) in order to provide complete implementation of the software part. All modern languages already provide modular design. Most languages implement, however, only the concept "operations" (also called methods, messages and so on depending upon the language used) as means for providing interaction. Lately it has however turned up several languages implementing also triggers (or "events" or "detecting points", once again depending upon the language used). These are mostly called "visual" languages, the best known being "Visual Basic" for MS-Windows. In fact, it may be better in practice not to use the denomination operation at all, but only triggers, since they mainly imply the same thing. The single small difference is that in an open interface the module implementing the interface must send the trigger to several modules, whereas the modules which are linked to this interface only will be able to send triggers (operations) to the modules implementing the interface. Generally it is implied in both cases, however, that a module sends the information to another one and that the other module may react on this information in a suitable way.

For elucidating the definition above of the invention according to the first aspect the following may furthermore be mentioned.

In case of linking together two modules all that is needed is that the modules shall be able to exchange information relating to the triggers and the operations in the interface. These are the memory addresses for all operations and triggers (i.e. the first instruction of the operation or trigger). The memory address for the operation is kept by the module that implements the interface, whereas the memory address for the triggers is kept by modules which are linked to the interface and these can be different for different link modules. When a link module is installed it will fetch the addresses for the operations of the interface to which linking shall be performed from a database (it is assumed that the software implementing the interface has already been installed and stored this information in the database), and it will send information relating to received triggers to the module implementing the interface. These will be stored in tables on each side. Whenever an operation is performed the module will perform the operation and look in the tables containing the addresses for the operation in order to find the correct address to jump to. When a trigger is sent to a specific function the module implementing the interface will conversely look into the tables it has for the function, and that contains the addresses for the trigger in the function, in order to find the correct address in the function to jump to. The above is mostly performed by the operating system.

Operations and triggers are context sensible, e.g. an operation may be valid for a certain call. With the way of operation that processors have today, this implies that the same instruction can be executed (so that the same memory addresses may be used), but these instructions will work with call specific data. A reference to where these data may be found (denominated instance) is also sent together with the operation. Conversely the same is true. The measures that shall be performed at receipt of a trigger may also depend upon the state of this instance.

DESCRIPTION OF THE DRAWINGS

Embodiments of the invention will now be described more closely below with reference to the attached drawings, on which FIG. 1 in the form of a block diagram illustrates the general design principles of the architecture of a system according to the invention, with a supplementary function plane and an interaction logic plane, FIG. 2 likewise in the form of a block diagram illustrates how, in the architecture according to FIG. 1, the interface between a supplementary function and the interaction plane can include several generic interfaces, FIG. 3 in the form of a flow diagram illustrates the interaction between two supplementary functions, FIG. 4 in the form of a block diagram illustrates a module for generic functions, FIG. 5 in a block and flow diagram illustrates a method to solve conflicts between supplementary functions.

DETAILED DESCRIPTION

Figure 1:
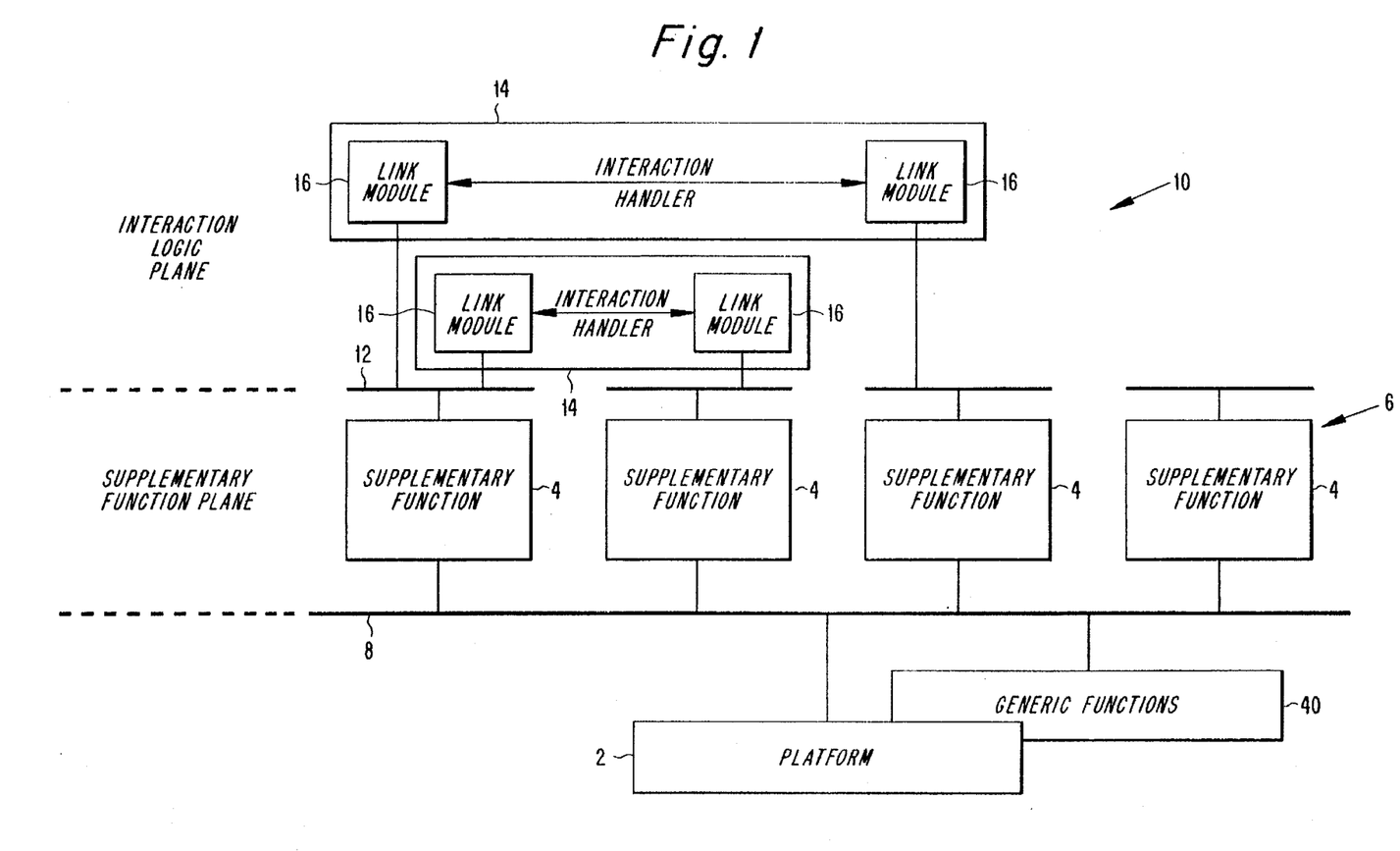

In FIG. 1 there is shown a telecommunication system structured to include a set of basic functions in a platform 2 and a set of supplementary functions 4 in a supplementary function plane 6. Each of the supplementary functions 4 is connectable to a specific basic function for forming an addition to and modifying this basic function. The basic functions implement one or more open interfaces 8 which are generic for all supplementary functions, and which admit interaction between the basic functions and the supplementary functions in such a way that new supplementary functions may be added to the system without affecting the basic functions. Interaction logic is located in a interaction logic plane 10 for solving problems with the respective behaviors of two supplementary functions, which are simultaneously connected to a specific basic function, coming into conflict with each other.

Each supplementary function 4 likewise implements at least one generic interface 12 which admits interaction between a supplementary function and an interaction handler 14, which is included in the interaction logic 10. More particularly, and as will appear below, the interface 12 is designed so that the interaction in question is performed in a way that new interaction handlers which are intended to interact with the supplementary function in question by use of this interface, may be added to the system without affecting the supplementary function.

The interfaces 12 are used by the interaction handler 14 for interacting with supplementary functions 4 in such a way that conflicts between the supplementary functions are avoided.

The system shown in FIG. 1 may be used for handling the use of basic functions and supplementary functions in a telecommunication network which contains several users which may call each other and subscribe to basic services and supplementary services relating to the basic and supplementary functions, respectively.

The basic idea of the invention is that supplementary functions 4, as well as the platform 2, shall implement a generic interface which may be used by the interaction logic 10. The two planes 6 and 10, respectively, consist each of one or more modular products.

In the same way as the platform 2 and the interfaces 8 between platform and supplementary functions should be transparent for the using supplementary functions, the supplementary functions 4 and their interfaces 12 between supplementary functions and interaction logic must be transparent for the using interaction logic. Furthermore link modules 16 in the interaction logic plane 10 shall be linked dynamically to activated supplementary functions.

Each interaction handler 14 is able to solve a specific interaction conflict and consists of at least one link module 16 for each supplementary function that is used by the interaction handler.

When a new supplementary function 4 is introduced it shall appear with all the necessary link modules 16 in the different interaction handlers 14 which are required for handling all interactions with other supplementary functions 4.

A loading module consists of link modules 16 in the same interaction handler 14, which depend from each other.

When a link module 16 is no longer used, either by the supplementary function, the interface of which it uses, being removed, or it being no longer used by any other link module in the interaction handler, the loading module is removed in which the link module is included.

Figure 2:
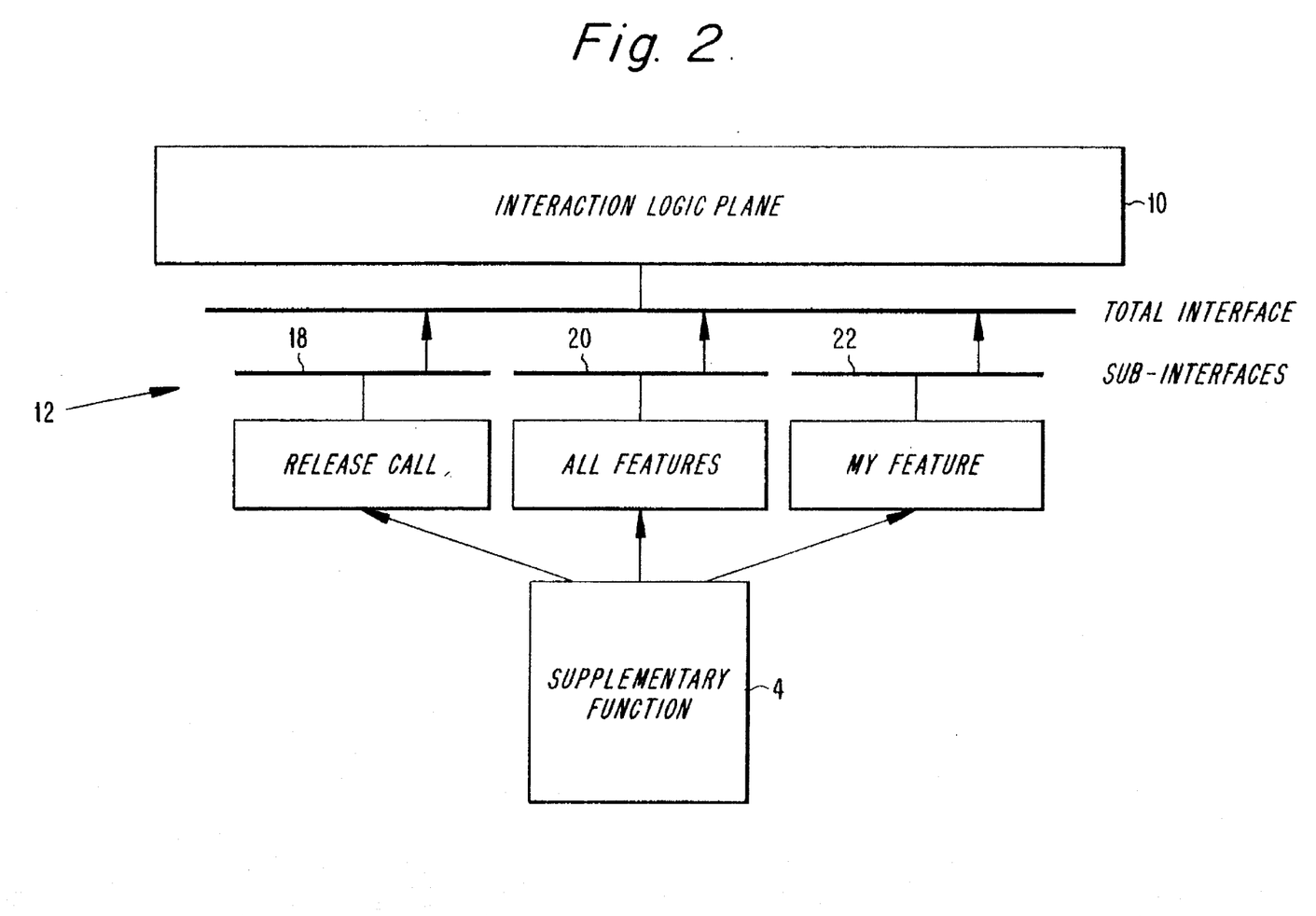

With reference to FIG. 2, the interface 12 formed by a supplementary function 4 with respect to the interaction logic plane 10, may consist of several generic parts 18, 20, 22, i.e. operations and triggers which are identical in the different supplementary functions. A supplementary function is analysed in an early stage for identifying its properties. Each property will then be related to a generic interface. There is e.g. a supplementary function which does not accept that certain calls continue which the basic service normally would allow to continue. This supplementary function therefore modifies the behavior of the basic service so that the call is released. All supplementary functions leading to release of a call must e.g. support the generic interface 18 "release-call". This interface 18 will consist of specific triggers and operations which may be applied to supplementary functions which release the call. A "call-to-be-released" trigger and a "hold-release" operation could e.g. form part of this generic interface 18.

The fact that an interface formed by supplementary functions may include several generic parts which are identical for a group of supplementary functions, admits more generic detection and solution code which may be used by all interaction handlers. This also admits so-called script programming. This type of programming is developed today for designing supplementary functions, and as an example there can be mentioned Ericsson's SSI (Service Script Interpreter), cf. Ericsson Review No. 67, 1990. A supplementary function is created by linking together generic modules which are also called "SIB" (Service Independent Building Blocks). The links between these SIB:s are called "script". This script is dynamically linked to an interface and is thereupon interpreted. Each SIB performs an action on a high abstraction level and uses the platform supplementary function interface for implementing this action. New SIB:s may be designed without affecting the platform. The architecture according to the invention admits that these productivity increasing tools may be used in the interaction logic plane 6.

Figure 3:
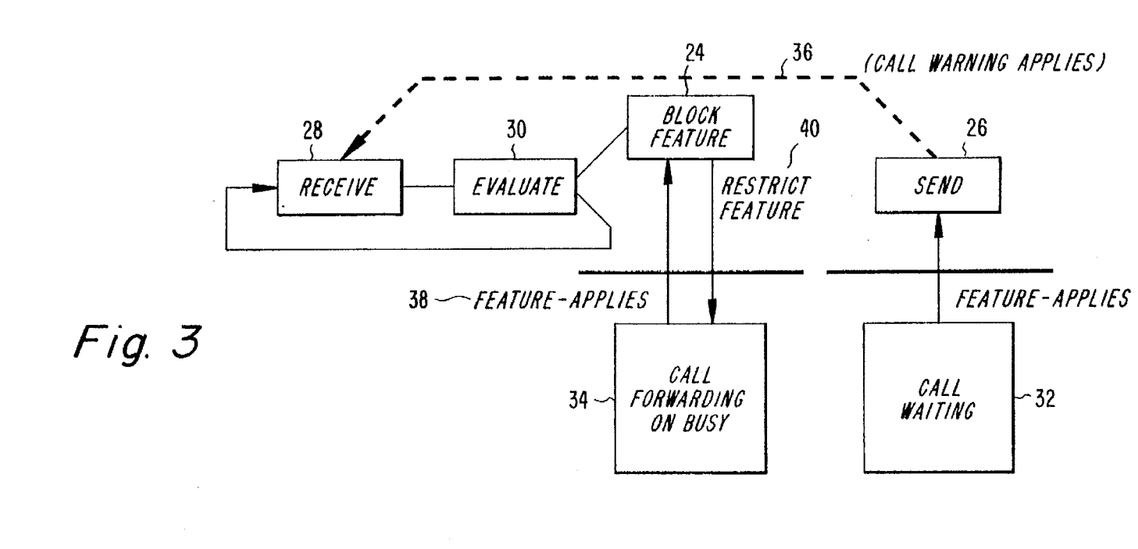

With reference to FIG. 3 e.g. the interaction: Block 'Call Forwarding on Busy' if 'Call Waiting applies' could be created by using a few SIBs. The required SIB:s are 'Block Feature' 24, which blocks the supplementary function to which said script is linked, one SIB 26 sending information from one link module to another one in the same interaction handler, one SIB 28 receiving this information, and one SIB 30 evaluating the received information for decision. These SIBs are linked together to form two scripts: one which is linked to 'Call Waiting' 32, and another one which is linked to 'Call Forwarding' 34.

The sending SIB 26 will send the information 'feature applies' 36 to the receiving SIB 28 in 'Call Forwarding', where 'feature' is filled with the name of the supplementary function 32 to which the SIB 26 is linked. In this case 'Call Waiting' is valid. The information is sent at receipt of the trigger 'feature applies' from 'Call Waiting' 32. This trigger forms part of the generic interface and indicates that the supplementary function 32 desires to act for the first time after activation of the basic function. The information is received by the receiving SIB 28 at 'Call Forwarding' 34.

The required synchronization between sending and receiving SIBs 26 and 28, respectively, (there may be a need for the information to be buffered, depending upon the script that executes first) is handled within the two SIB:s. When received this information is fed to the evaluating SIB 30, which will use 'Call Forwarding' specific tables (this reference was stored in SIB when the script in question was created), in order to be able to make a decision. Each possible decision will lead to a separate output. In this case 'Call Forwarding applies' 38 will lead to an output, to which 'Block Feature' 24 will be linked. This SIB 24 blocks the supplementary function 34, to which the script in question is linked. In order to do that it could supervise the generic trigger 38 'feature-applies' and thereafter instruct the generic operation 40 'restrict-feature', instructing the supplementary function 34 not to act.

Instead of 'Call Waiting applies' the sending script may send more general information, e.g. 'Tone-sending feature active', implying that 'Call Waiting' will send a tone to the busy user. In this case the script on 'Call Forwarding' must not be upgraded each time a supplementary function is introduced that sends a tone, and which must lead to blocking of 'Call Forwarding' in the same interaction handler.

SIBs specific to supplementary functions may likewise be created but the more generic SIBs may be used the greater the productivity gain is.

Although not clearly appearing from FIG. 1 the interaction logic plane 10 may also use the interface 8 between the supplementary function 4 and the platform 2. Generally a 'higher' plane has access to all 'lower' planes. Below the platform the operating system will be located which is also available to the supplementary function plane and to the interaction logic plane.

Figure 4:
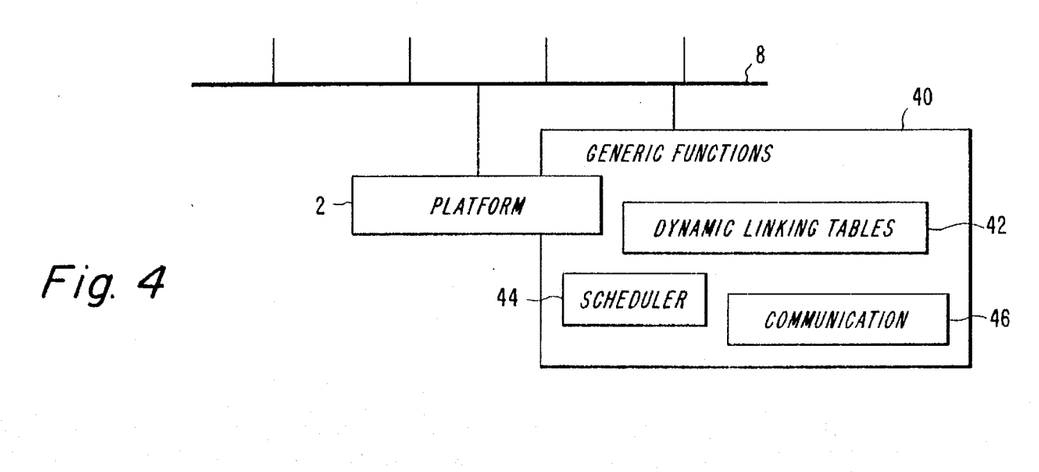

Due to the fact that both planes, and the interfaces they implement or use, follow the same principles there will always be functions which are very similar in the different planes. With reference to FIGS. 1 and 4 these functions may be included in a module 40 for generic functions. The functions in this module are used by both planes 6 and 10, or when handling the different interfaces 8 and 12.

Most functions required for handling dynamic linking will e.g. form part of this module. For the interface 8 between platform and supplementary function plane the link modules intended for dynamic linking are decided by the included different activation profiles, e.g. user, access, route. These profiles are analyzed, usually by interpreting tables 42, until a set of link modules is found, whereupon these modules are dynamically linked. Generally, the same function has to link interaction modules, except for the type of input being different. The platform will trig this function when a new profile is introduced and a supplementary function will trig this function first before it sends the trigger 'feature applies'.

Also the scheduler is implemented in the module 40 for generic functions. This function 44 is trigged by a trigger coming from the platform 2 or a supplementary function. It will also accept certain operations which will change scheduling.

Both the supplementary function plane 6 and the interaction logic plane 10 require communication between different link modules in the same basic function, e.g. by sending and receiving SIBs. The module 40 for generic functions will contain functions 46 simplifying this, in particular for connecting a plurality of link modules. Also the platform 2 may use this, since more separate activations of a basic function may require communication. A conference call consists e.g. of a number of separate but associated calls, which may be regarded as link modules from the point of view of the operating system.

The effectivity of the architecture according to the invention depends upon the structure in the interaction logic plane. It could be a desire that the structuring in the interaction logic plane e.g. should not lead to more conflicts between interaction modules than the number of conflicts solved in the supplementary function plane. As seen from another point of view, it will, however, be easier to identify such a structure, since the choice is only limited by technical considerations. In e.g. the supplementary function plane the structuring in different supplementary functions is controlled to a high degree by market considerations. As a principle, each function is sold separately, and therefore it must have a market value independently of other functions.

Different sturcturing in the interaction logic plane will usually lead to different principles for the interfaces which must be implemented by the supplementary functions, and different types of SIB:s. The principles for interfaces should be controlled by choice of generic interfaces.

At first a combination based solution will be discussed. In this structure each interaction handler 14 represents a unique set of supplementary functions 4 requiring solution if they all are included in the same call. Modularity in the interaction logic plane 10 is attained by replacing two or more conflicting modules with a separate one. For calls including supplementary functions A and B, e.g. an interaction handler "A–B" could handle the interactions. If the supplementary function C shall be linked to the call, "A–B" will be replaced by "A–B–C". Since "A–B–C" can be removed as soon as either A, B or C is removed, the loading modules in the interaction logic plane are similar to the complete interaction handler. When a new supplementary function is introduced each combination with other modules, i.e. supplementary functions or interaction handlers, may require a new interaction handler. The earlier described example with 'Call Forwarding on Busy' and 'Call Waiting' could correspond to this structure.

One possibility called "Flexible Service Profile" aims at solution of conflicts between supplementary functions on a per user basis. The idea is to create separate service scripts which include several supplementary functions. All interactions are hardcoded in these scripts. The idea is inspired by IN (Intelligent Networks), where the IN users as a definition are users providing a service (IN service) to other users in the network. SIB was first used within this connection. Using the new architecture the interaction logic plane could implement the real service scripts. A user could activate an interaction handler rather than a set of supplementary functions. The service scripts trigger the start of the correct supplementary functions. This requires certain extra programming in the supplementary functions. Besides this, the interface which must be implemented by the supplementary functions and the required SIBs are the same as for a combination based solution.

Figure 5:
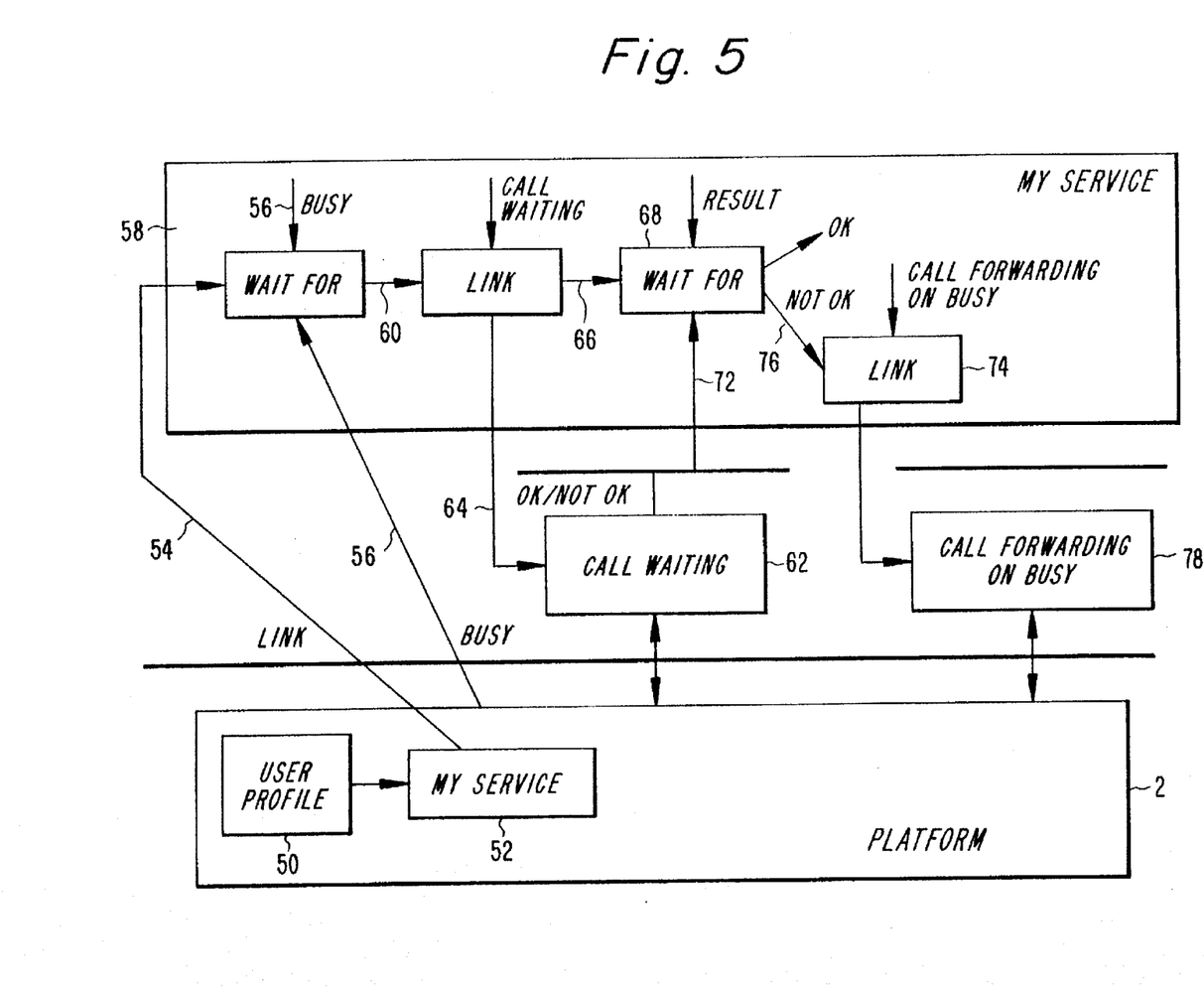

In FIG. 5 there is shown an example of this solution. The arrows entering SIB from above indicate the parameters for the SIB:s which are set when creating the script. The user profile 50 has 'MyService' 52 activated. 'MyService' has its own profile for this user including specific data for the user and references to link modules for the supplementary function. This profile is linked to the user. When an activated basic function finds that this particular user is the destination for a call, the dynamic linking functions of the system in the module for generic functions are called, with a reference to the profile as an input. The links from the profile to activated supplementary functions are traced and from there the links to the link modules are traced. The right link modules are then linked to the call, cf arrow 54.

'My Service' 52 will not manipulate the call until the user turns out to be busy. The first task for the script is therefore to supervise the "busy" trigger. As an optimization the user profile could be structured in such a way that the dynamic linking of 'MyService' is not done until the busy state appears. This requires that the user profile is analyzed more times in the call. The arrow 56 indicates the behavior of the "busy" trigger which forces wait-SIB 58 to disappear according to arrow 60.

Now it is time for 'MyService' 52 to decide how the conflict between 'Call Waiting' and 'Call Forwarding' shall be handled. In this case 'MyService' 52 decides to execute 'Call Waiting' 62 and not 'Call Forwarding'. As an alternative the choice could be stored in the 'MyService' profile for the user. The arrow 64 indicates the dynamic linking of 'Call Waiting' 62 and the start of execution of 'Call Waiting'. 'MyService' will call the dynamic linking function 42 in the module 40 for generic functions with a global reference to the right link module in 'Call Waiting' and its own reference. The later is required due to the fact that 'MyService' 52 must be linked to 'Call Waiting' 60 so that it can supervise the behavior of 'Call Waiting'. This may need a separate link module in 'MyService', since the script uses a new interface.

After 'Call Waiting' has started 'Call Waiting' 62 and 'MyService' 52 will execute in parallel. The measure according to arrow 66 leads to the next SIB which is the wait SIB 68. This wait SIB 68 awaits the trigger 'Result' 70 from 'Call Waiting'. This result will indicate OK: 'Call Waiting' successfully completed, or 'not OK': an error has appeared in 'Call Waiting'. When it arrives, arrow 72, the wait SIB 68 will select a separate output for each possible result. If the result is OK the script is completed. If not the link SIB 74 will, according to arrow 76, link 'Call Forwarding' 78 instead. It should be noted that this script is not complete, since at the result 'not OK', 'MyService' at first should check whether the call is in a state compatible to 'Call Forwarding' 78.

Several different solutions for avoiding the conflict are possible. With this concept it is possible to design more solutions for the same combination of included supplementary functions and apply them on direrent users. The structuring in the interaction logic plane is decided by the combination of supplementary functions which may be activated simultaneously for one single user. An interaction handler may be able to handle more alternatives and let the applicable alternative be decided by user data, or they can be handled by separate interaction handlers.

There are more concepts taking care of the interaction problem. Thus far, each such concept has included both advantages and disadvantages. The combination based solution e.g. still leads to a need for a great amount of interactions to be implemented, particularly due to conflicts between the different interaction handlers, which requires a further one for solving that. 'Flexible Service Profiles' take care only of the interaction for a single user. In each call there are, however, at least two users included, and more sophisticated supplementary functions may result in a great number of users being included in the same call. The more users with different activated supplementary functions or different alternatives for their interactions requiring a specific new supplementary function, the more new "packets" including the new supplementary function must be designed.

Another concept called 'negotiation' only takes care of the part lacking in 'Flexible Service Profiles': only interactions between users are taken into consideration.

The invention has a number of advantages.

One property of the system according to the invention is that the same principles and requirements are valid for both the interface between platform and supplementary function and the interface between supplementary function and interaction logic. The main requirement for both interfaces is e.g. that they must be stable, compatible backwards towards older versions and have a correct abstraction level. This gives the following results:

The interface between supplementary function and interaction logic can, from already existing implementations of the interface between the platform and supplementary functions, take advantage of already attained experience and experience to be attained. As long as the principles controlling the later interface are in a positive direction, the first mentioned interface will likewise be developed in a positive direction. It is absolutely necessary for each architecture that principles can be defined for interfaces which are stable and compatible backwards with earlier versions. Otherwise the modularity between platform and supplementary functions may not exist, which per se could make each attempt to shorten the introduction cycle for supplementary functions impossible. Due to this great attention has been directed to how to define such principles.

For attaining the goals the products implementing the interface must have a clear structure. Implementation of such an interface therefore implies improvement of the total quality of the supplementary function.

New tools and languages are developed for simplifying specification and implementation of interfaces. Several languages already include a separate specification for an open interface, e.g. Pascal, C++. The interface between supplementary function and interaction logic will immediately be able to take advantage of each improvement within this area.

New tools and languages are developed for simplifying specification and implementation of supplementary functions, e.g. clarifying languages, SIB. Most of these presuppose that an open interface is used by the supplementary functions. By means of the invention the same tools and languages may be used for implementing the required interactions. The traditional architecture is based essentially on tables for detection and priority adjustments for solution. They do not take advantage of these new technologies.

Another property of the architecture according to the invention is the optimum reuse of supplementary function data and code:

Since no other functions of a supplementary function need to be modified than the functions immediately affected by the interaction, fewer conflicts will be found later in the design, since the solution logic never will need to implement normal functions of the supplementary function. This will lead to a faster implementation of an interaction.

An optimum use of memory and processor capacity can be more easily attained, since no information has to be stored "in case of" which could be the case if the supplementary function actively must send information to the coordination module. The more effective the function is that handles dynamic linking of interaction components, the greater is the advantage attained. Since this function forms part of the module for generic functions it can be improved without affecting supplementary functions or interaction handlers.

The intention is to attain an effect opposite to that of a conventional architecture rather than simplifying the design of supplementary functions and force the interactions to handle the extra complications resulting therefrom. The conventional architecture aims at simplifying the design of supplementary functions and thus complicates the design of interactions. This is the price for interactions which continuously increase with each new supplementary function. Therefore, the invention will not only lead to more predictable and stable lead times, but also to shorter mean lead times in a system which already has a reasonable amount of supplementary functions.

What is claimed is:

1. A system for handling basic functions and supplementary functions in a telecommunication network serving a plurality of users, who can communicate with each other by said telecommunication network, and are allowed to subscribe to basic services and supplementary services, enabling the users to make use of said basic functions and supplementary functions, respectively, said system including:

a platform containing said basic functions and implementing supplementary function interfaces which each link one or more of said supplementary functions to the platform, each supplementary function consisting of one or more supplementary function link modules, one for each of said supplementary function interfaces that the supplementary function may need to use, said supplementary function link modules being located in a supplementary function plane; and interaction logic for detecting and solving conflicts between said supplementary and consisting of interaction logic link modules located in an interaction logic plane, said supplementary functions and supplementary function interfaces being transparent for the interaction logic and said interaction logic link modules being linkable to the supplementary functions.

2. A system according to claim 1, in which said interaction logic plane includes a number of interaction handler functions of which each is able to solve a specific conflict.

3. A system according to claim 2, in which each interaction handler function consists of at least one link module for each supplementary function, the supplementary function interface of which is used by the interaction handler function.

4. A system according to claim 3, in which a new supplementary function is introduced into the system together with all necessary link modules in different interaction handler functions required for handling interactions with other supplementary functions.

5. A system according to claim 4, in which link modules in an interaction handler function which are dependent on each other form a loading module.

6. A system according to claim 5, in which, when a link module is no longer used, the loading module is removed, in which said link module is included.

7. A system according to claim 1, further comprising an interface implemented by a supplementary function and containing several generic parts in the form of operations and triggers which are identical in different supplementary functions.

8. A system according to claim 1, in which the interaction logic plane also uses interfaces between supplementary functions and the platform.

9. A system according to claim 8, in which the interaction logic plane is divided into a detection plane and a solution plane with appurtenant link modules.

10. A system according to claim 9, in which the solution plane is structured so as to allow several solution modules to use one detection module.

11. A system according to claim 9, in which the detection plane is able to implement interfaces consisting only of triggers.

12. A system according to claim 11, in which the solution plane includes operations ignoring the detection plane for directly using the interface implemented by a supplementary function.

13. A system according to claim 9, further comprising a module for generic functions, wherein the generic functions are used by different planes and are used for handling different interfaces.

14. A system according to claim 13, in which functions for handling dynamic linking are included in said module for generic functions.

15. A system according to claim 13, in which a function for scheduling execution of supplementary functions is included in said module for generic functions.

16. A system according to claim 15, in which said function for scheduling is activated by a function of the platform or a supplementary function.

17. A system according to claim 13, in which said module for generic functions is adapted to receive operations changing scheduling of execution of supplementary functions.

18. A system according to claim 13, in which said module for generic functions includes functions handling communication in planes between different link modules in a supplementary function.

19. A system according to claim 13, in which said module for generic functions includes functions handling communication in the platform.

20. A telecommunication system including:
   a set of basic functions and a set of supplementary functions, wherein each of said supplementary functions can link with a certain basic function for forming an addition to and modifying the certain basic function, said basic functions implementing one or more open interfaces, the functionality of which is not specific for any supplementary function, that permit interaction between said basic functions and said supplementary functions allowing new supplementary functions to be added to the system without affecting the basic functions; and
   interaction logic, including interaction modules, for solving problems arising from the respective behaviors of two supplementary functions in conflict with each other when said two supplementary functions are simultaneously linked to a specific basic function wherein;
   each supplementary function implements at least one open interface permitting interaction between said interaction modules allowing new interaction modules intended to interact with said supplementary function by use of said at least one open interface, to be added to the system without affecting said supplementary function, said at least one open interface being used by the interaction modules for interacting with supplementary functions to avoid conflicts between said supplementary functions.

21. A system according to claim 20, in which said interaction logic includes a number of interaction handler functions of which each is able to solve a specific conflict.

22. A system according to claim 21, in which each interaction handler function consists of at least one link module for each supplementary function, the supplementary function interface of which is used by the interaction handler function.

23. A system according to claim 22, in which a new supplementary function is introduced into the system together with all necessary link modules in different interaction handler functions required for handling interactions with other supplementary functions.

24. A system according to claim 23, in which link modules in an interaction handler function which are dependent on each other form a loading module.

25. A system according to claim 24, in which, when a link module is no longer used, the loading module is removed, in which said link module is included.

26. A system according to claim 20, further comprising an interface implemented by a supplementary function and containing several generic parts in the form of operations and triggers which are identical in different supplementary functions.

27. A system according to claim 20, in which the interaction logic also uses interfaces between supplementary functions and the set of basic functions.

28. A system according to claim 27, in which the interaction logic is divided into a detection plane and a solution plane with appurtenant link modules.

29. A system according to claim 28, in which the solution plane is structured so as to allow several solution modules to use one detection module.

30. A system according to claim 28, in which the detection plane is able to implement interfaces consisting only of triggers.

31. A system according to claim 30, in which the solution plane includes operations ignoring the detection plane for directly using the interface implemented by a supplementary function.

32. A system according to claims 28 further comprising a module for generic functions, wherein the generic functions are used by different planes and are used for handling different interfaces.

33. A system according to claim 32, in which functions for handling dynamic linking are included in said module for generic functions.

34. A system according to claim 32, in which a function for scheduling execution of supplementary functions is included in said module for generic functions.

35. A system according to claim 34, in which said function for scheduling is activated by a basic function or a supplementary function.

36. A system according to claim 32, in which said module for generic functions is adapted to receive operations changing scheduling of execution of supplementary functions.

37. A system according to claim 32, in which said module for generic functions includes functions handling communication in planes between different link modules in a supplementary function.

38. A system according to claim 32, in which said module for generic functions includes functions handling communication in a platform including the set of basic functions.

* * * * *